US00RE43758E

(19) United States
(12) Reissued Patent
Matsutani et al.

(10) Patent Number: US RE43,758 E
(45) Date of Reissued Patent: Oct. 23, 2012

(54) SPARK PLUG WITH ALLOY CHIP

(75) Inventors: Wataru Matsutani, Nagoya (JP); Junichi Kagawa, Nagoya (JP)

(73) Assignee: NGK Spark Plug Co., Ltd., Aichi (JP)

(21) Appl. No.: 11/495,524

(22) Filed: Jul. 31, 2006

Related U.S. Patent Documents

Reissue of:
(64) Patent No.: 5,793,793
Issued: Aug. 11, 1998
Appl. No.: 08/883,145
Filed: Jun. 27, 1997

U.S. Applications:
(63) Continuation of application No. 09/513,215, filed on Feb. 23, 2000.

(30) Foreign Application Priority Data

Jun. 28, 1996 (JP) ..... 8-188347
Nov. 28, 1996 (JP) ..... 8-335119

(51) Int. Cl.
*H01T 13/20* (2006.01)
*H01T 13/39* (2006.01)

(52) U.S. Cl. ..... 313/141; 313/142

(58) Field of Classification Search ..... 445/23–25; 313/504–506, 118, 139–143, 136
See application file for complete search history.

(56) References Cited

U.S. PATENT DOCUMENTS 1,850,819 A 3/1932 Waltenberg et al.
4,324,588 A 4/1982 Zysk et al. ..... 75/208 R
(Continued)

FOREIGN PATENT DOCUMENTS

EP 0 243 529 A1 11/1987
(Continued)

OTHER PUBLICATIONS

European Search Report, European Application No. EP 99 12 2560, dated Dec. 14, 1999.

*Primary Examiner* — Joseph L Williams
(74) *Attorney, Agent, or Firm* — Morgan, Lewis & Bockius LLP

(57) ABSTRACT

Spark plug has a central electrode, an insulator provided exterior to the central electrode, main metallic shell provided exterior to the insulator in such a way that the central electrode protrudes from one end, and a ground electrode coupled at one end to the main metallic shell and which has the other end disposed to face the central electrode 3, with a chip being secured to either the central electrode or the ground electrode or both to form spark discharge gap g. The chip is made of a metal based on Ir which contains Rh in an amount ranging from 3 to 50 wt (50 wt % being not inclusive).

13 Claims, 3 Drawing Sheets

U.S. PATENT DOCUMENTS

| | | | | | |
|---|---|---|---|---|---|
| 4,700,103 | A | | 10/1987 | Yamaguchi et al. | 313/141 |
| 4,893,051 | A | | 1/1990 | Kondo | 313/141 |
| 5,320,569 | A | | 6/1994 | Oshima et al. | 445/7 |
| 5,440,198 | A | | 8/1995 | Oshima et al. | 313/141 |
| 5,461,275 | A | | 10/1995 | Oshima | 313/141 |
| 5,465,022 | A | * | 11/1995 | Katoh et al. | 313/144 |
| 5,578,895 | A | | 11/1996 | Oshima | 313/141 |
| 5,853,904 | A | | 12/1998 | Hall et al. | 428/670 |
| 5,973,443 | A | | 10/1999 | Chang et al. | 313/141 |
| 5,977,695 | A | | 11/1999 | Osamura et al. | 313/141 |
| 6,094,000 | A | | 7/2000 | Osamura et al. | 313/141 |
| 6,147,441 | A | * | 11/2000 | Osamura | 313/141 |

FOREIGN PATENT DOCUMENTS

| | | | |
|---|---|---|---|
| EP | A-243-529 | | 11/1987 |
| EP | 0 418 055 | A1 | 3/1991 |
| EP | A-575-163 | | 12/1993 |
| EP | 0 587 446 | A1 | 3/1994 |
| EP | 0 637 113 | A1 | 2/1995 |
| EP | 0 702 093 | A1 | 3/1996 |
| EP | A-702-093 | | 3/1996 |
| EP | D1-0-243-529 | | 6/2001 |
| EP | D3-0-702-093 | | 6/2001 |
| EP | D4-0-575-163 | | 6/2001 |
| GB | 479540 | | 2/1938 |
| GB | A-479-540 | | 2/1938 |
| GB | 2 302 367 | | 1/1997 |
| GB | 2302367 | A | 1/1997 |
| GB | D2-479-540 | | 6/2001 |
| JP | 148891 | | 3/1942 |
| JP | 57-130384 | | 8/1982 |
| JP | 62-58114 | | 12/1987 |
| JP | 3-110779 | | 5/1991 |
| JP | 4-329286 | | 11/1992 |
| JP | 5-159857 | | 6/1993 |
| JP | 5-335066 | | 12/1993 |
| JP | 6-36856 | | 2/1994 |
| JP | 7-37673 | | 2/1995 |
| JP | 7-37674 | | 2/1995 |
| JP | 7-268574 | | 10/1995 |
| JP | 8-45643 | | 2/1996 |
| JP | 9-7733 | | 1/1997 |
| JP | 10-32076 | | 2/1998 |

* cited by examiner

SPARK PLUG WITH ALLOY CHIP

Matter enclosed in heavy brackets [ ] appears in the original patent but forms no part of this reissue specification; matter printed in italics indicates the additions made by reissue.

*This is a continuation of copending Re-Issue application Ser. No. 09/513,215 filed on Feb. 23, 2000, which is hereby incorporated by reference. This application claims the benefit of Japanese Patent Application Nos. 8-188347 (filed Jun. 28, 1996) and 8-335119 (filed Nov. 28, 1996.*

BACKGROUND OF THE INVENTION

1. Field of the invention

The present invention relates to a spark plug for use in internal combustion engines.

2. Description of the Related Art

Conventional spark plugs for use in internal combustion engines such as automotive engines have the igniting portion formed of a platinum (Pt) alloy chip welded to the tip end of an electrode in order to improve its resistance to spark consumption. However, in view of the high cost of platinum, it has been proposed to use less expensive iridium (Ir) as a chip material.

A problem with the use of Ir as a material to constitute the igniting portion of the spark plug is that Ir is easy to oxidize and evaporate in a high temperature range of 900° to 1,000° C. Therefore, if it is directly used in the igniting portion of the electrode, it is more consumed by oxidation and evaporation than by spark. Therefore, the spark plug using Ir in the igniting portion of an electrode is highly durable using low-temperature conditions as in driving on city roads but their endurance drops considerably during continuous running at high speed.

SUMMARY OF THE INVENTION

It is an object of the present invention to provide a spark plug having an igniting portion chiefly made of Ir and which yet is sufficiently resistant to consumption by oxidation and evaporation of the Ir component at elevated temperatures to assure high endurance not only during driving on city roads but also during continuous running at high speed.

A spark plug according to the present invention is comprised of: a central electrode; an insulator provided exterior to the central electrode; a main metallic shell provided exterior to the insulator, a ground electrode coupled at one end to the main metallic shell and which has the other end disposed to face the central electrode; and an igniting portion that is secured to at least one of the central electrode and the ground electrode for forming a spark discharge gap; wherein the igniting portion is made of an alloy based on Ir which contains Rh in an amount ranging from 3 to 50 wt % (50 wt % being not inclusive).

According to the present invention, the igniting portion of an electrode which forms a spark discharge gap is made of an alloy that is mainly made of Ir and which contains an amount of Rh in the stated range, Therefore, the consumption due to oxidation and evaporation of the Ir component at high temperatures is effectively retarded to thereby realize a highly durable spark plug.

DETAILED DESCRIPTION OF THE INVENTION

Figure 1:
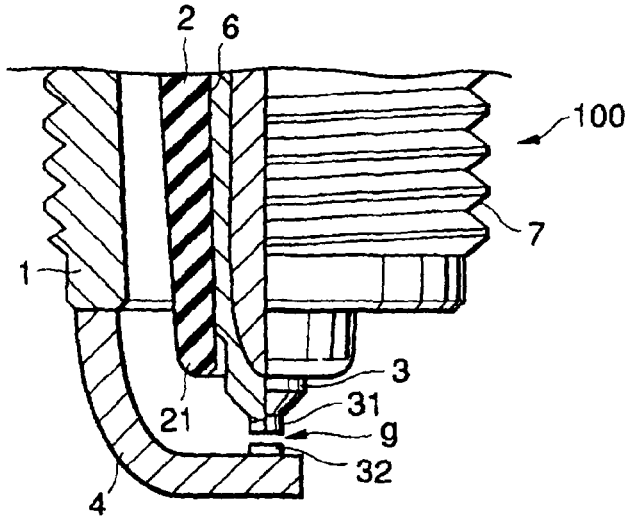
FIG. 1 is a partial front sectional view of the spark plug of the invention.
Figure 2:
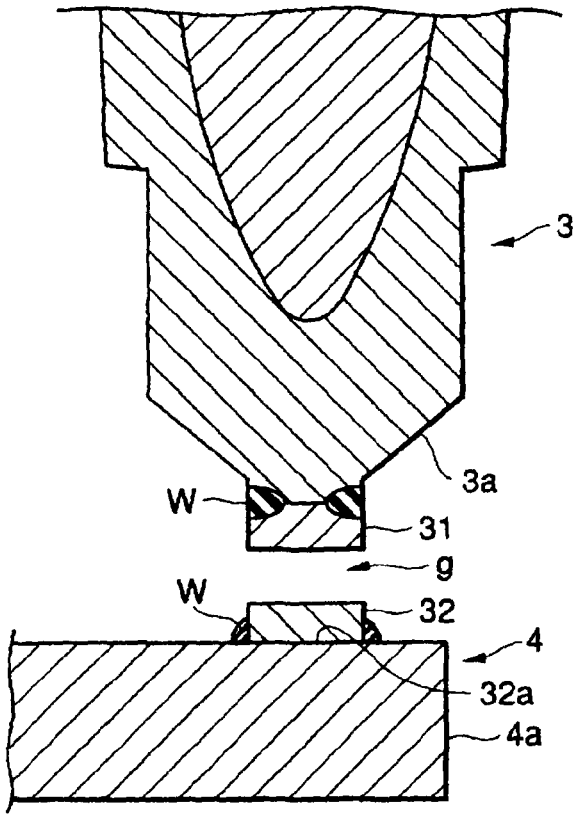
FIG. 2 is a sectional view showing enlarged the essential part of the same spark plug.

Detailed description of the present invention will be described as follows.

The spark plug according to the present invention has a central electrode, an insulator provided exterior to the central electrode, a main metallic shell provided exterior to the insulator, a ground electrode coupled at one end to the main metallic shell and which has the other end disposed to face the central electrode, and an igniting portion that is secured to either the central electrode or the ground electrode or both for forming a spark discharge gap, wherein the igniting portion is made of an alloy based on Ir which contains Rh in an amount ranging from 3 to 50 wt % (50 wt % being not inclusive).

The present inventors have found that if the igniting portion of an electrode which forms a spark discharge gap is made of an alloy that is mainly made of Ir and which contains an amount of Rh in the stated ranger the consumption due to oxidation and evaporation of the Ir component at high temperatures is effectively retarded to thereby realize a highly durable spark plug, In order to form the igniting portion, a chip made of a metal having the stated composition may be joined by welding to the ground electrode and/or the central electrode. The term "igniting portion" as used herein shall refer to that part of the joined chip which has not been subject to the effect of the compositional change due to welding (e.g., the portion other than that which has been alloyed with the constituent material of the ground or central electrode upon welding), If the Rh content of the alloy is less than 3%, the effectiveness of Rh in retarding the oxidation and evaporation of Ir is insufficient to prevent premature consumption of the igniting portion. Hence, the endurance of the spark plug is reduced. In this case, the igniting portion is consumed primarily in the tip end face of the chip welded to the central electrode and/or the ground electrode. However, the lateral sides of the drip may also be consumed if the Rh content is reduced. In such an extreme situation, the cross-sectional area of the chip through which a current is applied to cause spark discharge will decrease and the applied electric field tends to concentrate on the tip end face of the chip, whereby the consumption of the igniting portion will proceed at an accelerated rate and the life of the spark plug comes to an end prematurely. Therefore, the Rh content of the alloy is desirably adjusted to lie within such a range that the consumption of the igniting portion is unlikely to occur not only in the tip end face of the chip but also on its lateral sides. On the other hand, it the Rh content of the alloy is 50 wt % or more, the melting point of the alloy will drop and the endurance of the spark plug will deteriorate accordingly. Therefore, the Rh content of the alloy is preferably adjusted to lie within the range of 3 to 50 wt % (50 wt % being not inclusive), desirably 7 to 30 wt %, more desirably 15 to 25 wt %, most desirably 18 to 22 wt %.

Embodiments of the invention will now be described with reference to the accompanying drawings as follows.

FIG. 1 shows an embodiment of the present invention. In the drawing, a spark plug 100 has a tubular main metallic shell 1, an insulator 2 fitted into the metallic shell 1 in such a way that the tip end 21 protrudes from the metallic shell 1, a central electrode 3 provided within the insulator 2 in such a way that the igniting portion 31 formed at the tip end protrudes from the insulator 2, and a ground electrode 4 coupled at one end to the main metallic shell 1 as by welding and which has the other end bent laterally such that its lateral aide faces the tip end of the central electrode 3. The ground electrode 4 has an igniting portion 32 formed in such a way that it faces the igniting portion 31 of the central electrode 3; the clearance between the two igniting portions 31 and 32 forms a spark discharge gap g.

The insulator 2 is a sintex of a ceramic material such as alumina or aluminum nitride as a main constituent, and it has an axial bore 6 through which the central electrode 3 is to be fitted. The main metallic shell 1 is a cylinderical form made of a metal such as a lowcarbon steel and which provides is a housing for the spark plug 100. The circumference of the metallic shell 1 has a threaded portion 7 formed to assist in the mounting of the spark plug 100 on an engine block (not shown).

The main body 3a of the central electrode 3 and the main body 4a of the ground electrode 4 are both typically made of a Ni allloy. The igniting portion 31 of the central electrode 3 and the opposed firing portion 32 of the ground electrode 4 are both made of an alloy based on Ir and which contains Rh in an amount ranging from 3 to 50 wt % (50 wt % being not inclusive). The Rh content of the alloy is desirably adjusted to lie within a range of 7 to 30 wt %, more desirably 15 to 25 wt %, most desirably 18 to 22 wt %.

As shown in FIG. 21 the main body 3a of the central electrode 3 tapers at the tip end and its tip end face is formed flat A disk-shaped chip having an alloy formula for the igniting portion 31 is placed on the flat tip end face and laser welding, electron beam welding, resistance welding or other suitable welding technique is applied to the periphery of the joined surfaces to form a weld line W, whereby the chip is securely fixed to the tip end face of the central electrode 3 to form the igniting portion 31. To form the opposed igniting portion 32, a similar chip is placed on the ground electrode 4 in registry with the position of the igniting portion 31 and a weld line W is similarly formed on the periphery of the joined surfaces, whereby the chip is securely fitted to the ground electrode 4 to form the igniting portion 32. The chips may be formed from a molten material obtained by mixing the necessary alloy ingredients to give the stated formula and melting the mixture, alternatively, the chips may be formed from a sinter obtained by shaping into a compact a suitable alloy powder or a mixture of the powders of elemental metal components in specified proportions and sintering the compact.

If the chips are formed of a molten alloy, a raw material made of the molten alloy may be subjected to a working process including at least one of rolling, forging, drawing, cutting, shearing and blanking steps, whereby the chips are produced in a specified shape. Steps such as rolling, forging and cutting may be performed with the alloy being heated to a specified temperature (to effect "hot" or "warm" working). The temperature for these steps which is variable with the alloy composition may typically be at least 700° C.

Stated more specifically, a molten alloy may be hot rolled to a sheet, which is hot blanked to chips of a specified shape; alternatively, the molten alloy may be hot rolled or forged to a wire or rod shape, which is cut to chips of a specified length. The iridium (Ir) which is the chief component of the chips has low ductility or malleability in its elemental form; however, in the presence of added Rh, the workability of the Ir is improved such that the resulting alloy can be rolled or forged into a sheet, a rod or a wire with great ease compared to the case where Rh is not added. Stated specifically, defects such as cracking are less likely to occur in the raw alloy material being in the process of rolling or forging and this in turn contributes to improvements in the efficiency of chip production and the materials yield. It should be noted here that the workability of the raw alloy material will increase with increasing Rn addition.

If desired, either one of the two opposed igniting portions 31 and 32 may be omitted. If this is the case, the spark discharge gap g is formed between the igniting portion 31 (or the opposed igniting portion 32) and the ground electrode 4 (or the central electrode 3).

The spark plug 100 operates according to the following mode of action, The spark 100 is fitted on an engine block by means of the threaded portion 7 and used as a source to ignite an air-fuel mixture that is supplied into the combustion chamber. The igniting portion 31 and the opposed igniting portion 32 define the spark discharge gap g; since both igniting portions are made of the aforementioned alloy, their consumption due to the oxidation and evaporation of Ir is sufficiently retarded to ensure that the spark discharge gap g will not increase for a prolonged period, thereby extending the life of the spark plug 100.

EXAMPLES

Example 1

Specified amounts of Ir and Rh were mixed and melted to prepare alloy samples containing various amounts of Rh in the range of 0 to 60 wt %, with the balance being substantially composed of Ir (comparative samples: Rh=0 and 60 wt %). The samples were hot rolled to sheets, from which disk-shaped chips measuring 0.7 mm in diameter and 0.5 mm in thickness were sliced by electrical discharge machining. A chip prepared from a molten alloy consisting of 13 wt % Ir and the balance Pt was also fabricated as a comparison. The thus fabricated chips were used to form the igniting portion 31 of the spark plug 100 and the opposed igniting portion 32 (to provide a spark discharge gap g of 1.1 mm). The individual plugs were subjected to performance tests under the following conditions.

Condition A (Simulating Continuouus Running at High Speed)

Figure 3:
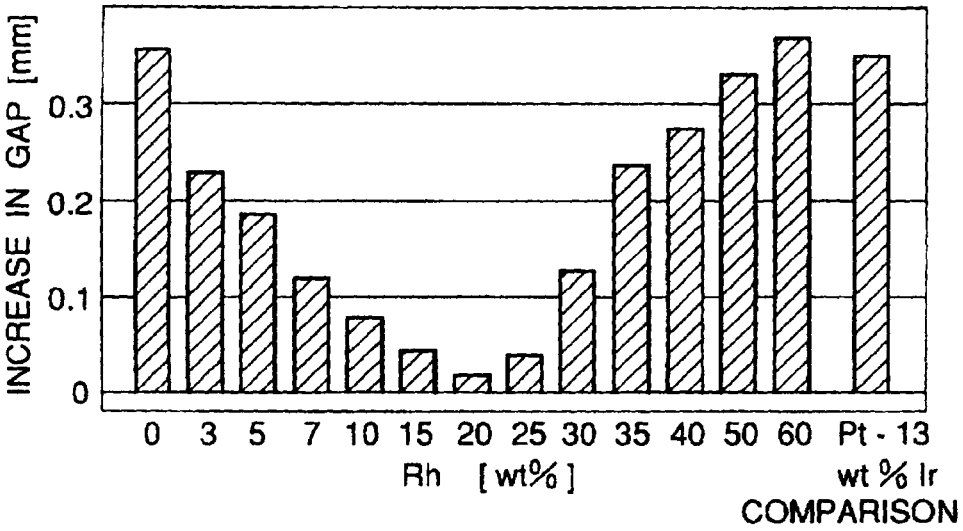
FIG. 3 is a graph showing the relationship between the Rh content of the alloy forming the igniting portions of the spark plug and the increase in the spark discharge gap (in Example 1 under condition A)

A six-cylinder gasoline engine (piston displacement=3,000 cc) was fitted with the plug under test and operated continuously at full throttle for 300 hours at a rotational speed of 6,000 rpm (with the temperature of the central electrode rising to about 900° C.); after the engine operation, the increase in the spark discharge gap g on the plug was measured. The result is shown in FIG. 3 in terms of the relationship between the Rh content of the alloy and the increase in the spark discharge gap.

Condition B (Simulating Cruising on City Roads)

Figure 4:
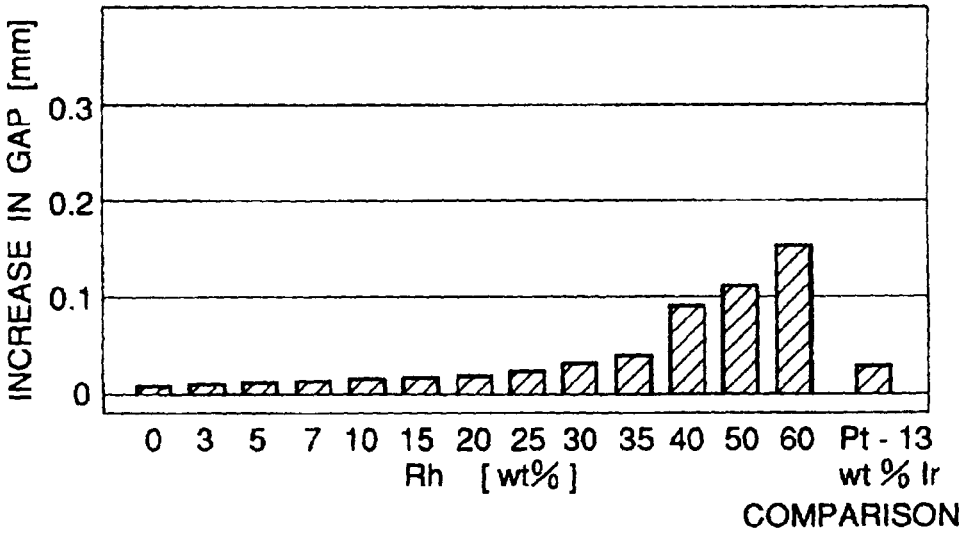
FIG. 4 is a graph showing the relationship between the Rh content of the alloy forming the igniting portions of the spark plug and the increase in the spark discharge gap (in Example 1 under condition B)

A four-cylinder gasoline engine (piston displacement=2,000 cc) was fitted with the plug under test and operated for 1,000 hours through cycles, each consisting of 1-min idling, 30-min running at full throttle and a rotational speed of 3,500 rpm and 20-min running at half throttle and a rotational speed of 2,000 rpm, with the temperature of the central electrode rising to about 780° C.; after the engine operation, the increase in the spark discharge gap g on the plug was measured. The result is shown in FIG. 4 in terms of the relationship between the Rh content of the alloy and the increase in the spark discharge gap.

The result of the test under condition B indicates that the plugs using chips made of alloy formulae within the range of the invention experienced only small increases in the spark discharge gap g whereas the comparative plugs (Rh=60 wt %, and Pt-Ir alloy) had the spark discharge gap increased markedly. The difference of the invention samples with respect to the comparisons was more pronounced under condition A of a higher load than condition B. It is also clear from FIG. 3 that the increase in the spark discharge gap decreased stepwise as the range of the Rh content varied from that of 3 to 50 wt % to 7 to 30 wt % and then to 15 to 25 wt %; in particular, the plugs using chips containing 15 to 25 wt % of Rh exhibited a very high level of endurance in spite of the hostile operating condition.

It should also be noted that compared to a raw material that was solely composed of elemental Ir in the absence of Rh, the raw alloy materials containing 15 to 25 wt % of Rh tended to develop less cracking when the were hot rolled to sheets Examples 2

Specified amounts of Ir and Rh were mixed and melted to prepare alloy samples containing Rh in 15, 18, 20, 22 and 25 wt %, with the balance being substantially composed of Ir. Chips were fabricated from these alloy samples and used to produce spark plugs as in Example 1. The plugs were subjected to a performance test under the following condition C which was more hostile than condition A employed in Example 1.

Condition C

A four-cylinder gasoline engine (piston displacement=1600 cc) was fitted with the plug under test and operated continuously at full throttle for 300 hours at a rotational speed of 6,250 rpm (with the temperature of the central electrode rising to about 950° C.); after the engine operation, the increase in the spark discharge gap g on the plug was measured. The result is shown in FIG. 5 in terms of the relationship between the Rh content of the alloy and the increase in the spark discharge gap.

Figure 5:
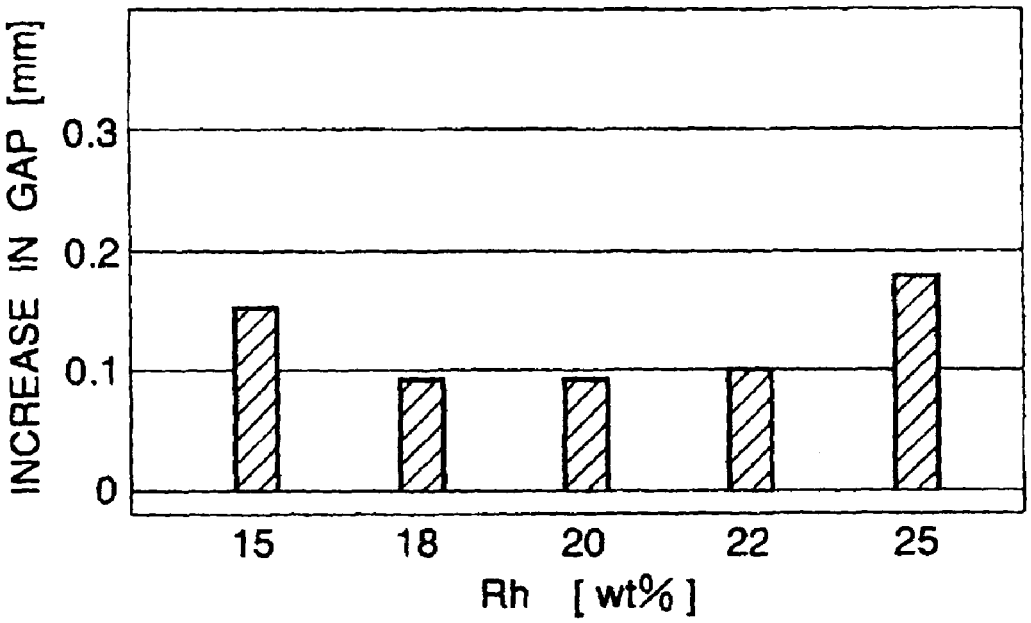
FIG. 5 is a graph showing the relationship between the Rh content of the alloy forming the igniting portions of the park plug and the increase in the spark discharge gap (in Example 1 under condition C).

It is clear from FIG. 5 that even under condition C which was more hostile than condition B. The plugs using the chips containing 18 to 22 wt % of Rh experienced smaller increases in the gap and proved to be more durable than the pugs using the chips containing Rh in amounts outside the stated range.

What is claimed is:

1. A spark plug comprising:

a central electrode;

an insulator provided exterior to the central electrode;

a main metallic shell provided exterior to the insulator;

a ground electrode [coupled to one end of the main metallic shell and having] *one end coupled to the main metallic shell and* another end facing the central electrode; and an igniting portion secured to at least one of the central electrode and the ground electrode, and forming a spark discharge gap;

*wherein a taper portion is formed at a tip end side of the central electrode, and the chip is bonded to the tip end face of the taper portion so as to form the igniting portion;* wherein the igniting portion includes an Ir-based alloy including Rh in an amount ranging from over 10% to less than 30% wt %.

2. [A] *The* spark plug according to claim 1, wherein the Ir-based alloy includes Rh in an amount ranging from 15 to 25 wt %.

3. [A] *The* spark plug according to claim 1, wherein the Ir-based alloy includes Rh in an amount ranging from 18 to 22 wt %.

*4. A method for producing a spark plug including a central electrode; an insulator provided exterior to the central electrode; a main metallic shell provided exterior to the insulator; a ground electrode having one end coupled to the main metallic shell and another end facing the central electrode; and an igniting portion secured to at least one of the central electrode and the ground electrode and forming a spark plug gap; the method comprising:*

*placing a chip including an Ir-based alloy including Rh in an amount ranging from over 10 wt % to less than 25 wt % on a tip end face of the central electrode comprising Ni alloy; and*

*forming an annular welding portion laid across the chip and the central electrode, so as to form the igniting portion including an Ir-based alloy including Rh in an amount ranging from over 10 wt % to less than 25 wt %.*

*5. The spark plug according to the method of claim 4, wherein the welding portion is exposed to an outer periphery of the chip, and is not exposed to the tip end face of the chip.*

*6. The spark plug according to the method of claim 4, wherein the central electrode is arranged such that the whole of the taper portion protrudes from an outside of an opening edge of a through hole of the insulator, the central electrode being inserted into the through hole.*

*7. The spark plug according to the method of claim 4, wherein the chip is produced by working a molten alloy including an Ir-based alloy including Rh in an amount ranging from over 10 wt % to less than 30 wt % at 700° C. or more by hot rolling or hot forging to a wire or rod shape, and thereafter, cutting the worked alloy to a specified length in a longitudinal direction.*

*8. The spark plug according to the method of claim 4, wherein the chip is produced by working a molten alloy including an Ir-based alloy including Rh in an amount ranging from over 10 wt % to less than 30 wt % at 700° C. or more by hot rolling to a sheet, hot blanking the sheet to a chip of a specified shape, and welding and bonding the chip.*

*9. The spark plug according to the method of claim 4, wherein the igniting portion includes an Ir-based alloy including Rh in an amount ranging from 15 wt % to less than 25 wt %.*

*10. The spark plug according to the method of claim 4, wherein the igniting portion includes an Ir-based alloy including Rh in an amount ranging from 18 wt % to less than 22 wt %.*

*11. A spark plug comprising:*

*a central electrode;*

*an insulator provided exterior to the central electrode;*

*a main metallic shell provided exterior to the insulator;*

*a ground electrode coupled to one end of the main metallic shell and having another end facing the central electrode; and*

*an igniting portion secured to at least one of the central electrode and the ground electrode, and forming a spark discharge gap;*

*wherein a taper portion is formed at a tip end side of the central electrode, and the chip is bonded to the tip end face of the taper portion so as to form the igniting portion;*

*wherein the igniting portion includes an Ir-based alloy including Rh in an amount ranging from over 10% to less than 30% wt %.*

*12. A spark plug according to claim 11, wherein the Ir-based alloy includes Rh in an amount ranging from 15 to 25 wt %.*

*13. A spark plug according to claim 11, wherein the Ir-based alloy includes Rh in a amount ranging from 18 to 22 wt %.*

* * * * *